United States Patent
Chuang

(10) Patent No.: US 8,032,140 B2
(45) Date of Patent: Oct. 4, 2011

(54) WIRELESS COMMUNICATION DEVICE AND HANDOVER WARNING METHOD

(75) Inventor: Ching-Kuei Chuang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 900 days.

(21) Appl. No.: 11/952,954

(22) Filed: Dec. 7, 2007

(65) Prior Publication Data
US 2009/0054064 A1 Feb. 26, 2009

(30) Foreign Application Priority Data

Aug. 20, 2007 (CN) .......................... 2007 1 0201401

(51) Int. Cl.
*H04W 36/00* (2009.01)

(52) U.S. Cl. .................. 455/436; 455/432.1; 455/435.1; 455/442; 455/437; 455/438; 370/331; 370/332; 370/333; 370/334

(58) Field of Classification Search .......... 370/328–333; 455/432.1, 435.1–453
See application file for complete search history.

(56) References Cited

U.S. PATENT DOCUMENTS

| 5,710,986 | A | * | 1/1998 | Obayashi et al. | .......... 455/553.1 |
| 5,901,145 | A | * | 5/1999 | Sawyer | .......... 370/332 |
| 7,184,765 | B1 | * | 2/2007 | Birnie et al. | .......... 455/432.3 |
| 2004/0198381 | A1 | * | 10/2004 | Siegel et al. | .......... 455/456.1 |
| 2007/0032236 | A1 | * | 2/2007 | Kim et al. | .......... 455/436 |
| 2007/0049278 | A1 | * | 3/2007 | Lindoff et al. | .......... 455/439 |

FOREIGN PATENT DOCUMENTS

CN 1286585A A 3/2001

* cited by examiner

*Primary Examiner* — Dai A Phuong
(74) *Attorney, Agent, or Firm* — Altis Law Group, Inc.

(57) ABSTRACT

A wireless communication device (100) includes a receiving module (11), a storage module (12), a processing module (13) and a warning module (14). The receiving module receives data sent by a base station of a network communicating with the wireless communication device. The storage module is electronically connected to the receiving module, and stores the received data. The processing module is electronically connected to the receiving module and the storage module, and processes the received data. The warning module is electronically connected to the processing module, and outputs an alerting signal in accordance with the processing result of the processing module if the wireless communication device is actuated during a call and the base station of the network communicating with the wireless communication device is switched from one to another.

3 Claims, 2 Drawing Sheets

WIRELESS COMMUNICATION DEVICE AND HANDOVER WARNING METHOD

BACKGROUND OF THE INVENTION

1. Field of the Invention

The present invention relates to wireless communication devices and, particularly, to a wireless communication device that can alert user when handover takes place, and a handover warning method of the wireless communication device.

2. Description of Related Art

Presently, wireless communication devices such as mobile phones and personal digital assistant can travel between different service areas on which the wireless communication device is operating. Generally, each service area has at least one base station instantaneously sending cell broadcasts such as service provider information, time or news to wireless communication devices. The cell broadcasts will then be displayed on the display interface of the wireless communication device. The service provider of the wireless communication device is identified by the displayed broadcast, thus service charge of the wireless communication devices can be calculated by means of relative calculating method of the identified service provider.

When a wireless communication device moves form one service area to another in use, a handover may occur, i.e., the wireless communication network communicating with the wireless communication device being switched to another wireless communication network when entering different service area. However, most typical wireless communication devices cannot receive cell broadcast in an ongoing communication, therefore, the handover is not perceptible to the user until the call is over. As a result of that, users of the wireless communication device cannot be alerted of different service charges of each service area/network during a call. Thus, when the typical wireless communication device enters a new service area, no information is provided to alert the users of the different service charge.

Therefore, a wireless communication device with handover warning method being used in calls is desired in order to overcome the above-described shortcomings.

SUMMARY

In one aspect, a wireless communication device includes a receiving module, a storage module, a processing module and a warning module. The receiving module receives data sent by a base station of a wireless communication network communicating with the wireless communication device. The storage module is electronically connected to the receiving module, and stores the received data. The processing module is electronically connected to the receiving module and the storage module. The processing module processes the received data. The warning module is electronically connected to the processing module, and outputs an alerting signal in accordance with the processing result of the processing module if the wireless communication device is actuated during a call and the base station of the network communicating with the wireless communication device is switched from one to another.

In another aspect, a handover warning method for wireless communication devices in a call, comprising these steps: providing a wireless communication device and a warning system installed in the wireless communication device; actuating the wireless communication device in a service area; locating the wireless communication device; using the wireless communication device to call; and outputting a alerting signal with the warning system when the wireless communicating device enters a new service area.

Other advantages and novel features will become more apparent from the following detailed description when taken in conjunction with the accompanying drawings.

BRIEF DESCRIPTION OF THE DRAWINGS

Many aspects of the present wireless communication device and handover warning method can be better understood with reference to the following drawings. The components in the various drawings are not necessarily drawn to scale, the emphasis instead being placed upon clearly illustrating the principles of the present wireless communication device and handover warning method. Moreover, in the drawings, like reference numerals designate corresponding parts throughout the diagrams.

DETAILED DESCRIPTION OF THE INVENTION

Figure 1:
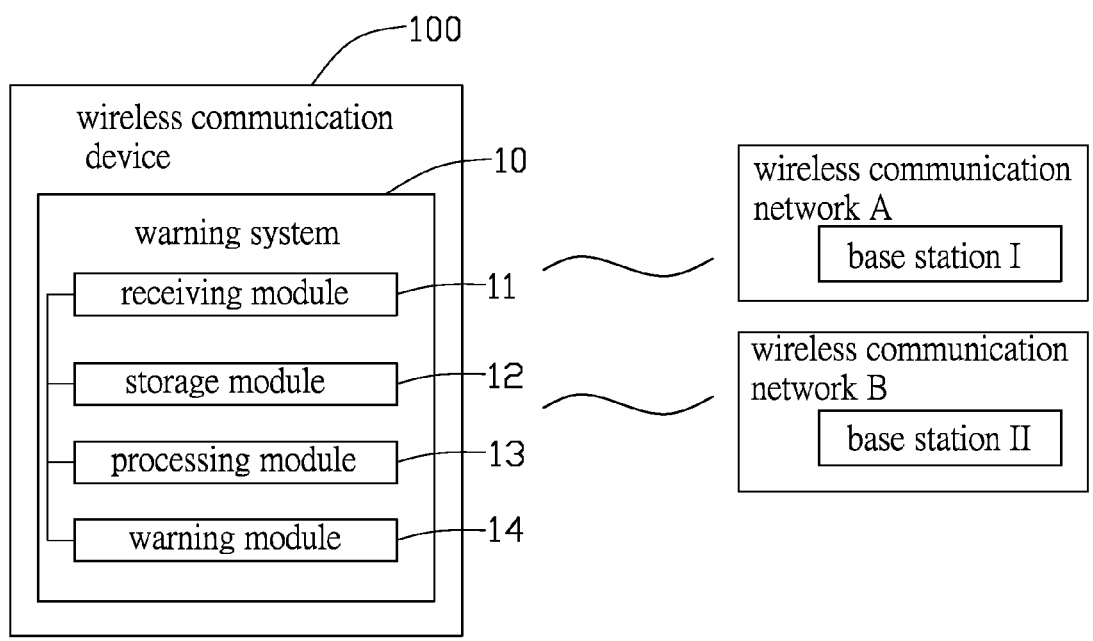
FIG. 1 is a diagram of a wireless communication device, in accordance with a present embodiment.

Referring now to the drawings in detail, FIG. 1 shows a wireless communication device 100, in accordance with a present embodiment. The wireless communication device 100 can be a mobile phone, a laptop, etc. The wireless communication device includes a warning system 10. The warning system 10 includes a receiving module 11, a storage module 12, a processing module 13 and a warning module 14.

The receiving module 11 is configured to receive data from base stations, such as the shown base station I or base station II, in a predetermined frequency, such as once per second or once per five seconds. The data mainly includes cell broadcast and cell identification (ID) of the service areas corresponding to the base stations, etc. The receiving module 11 can also record sending frequency of the base station and receive handover commands sent by the base station. The receiving module 11 can either be mounted independently within the wireless communication device 100 or combined with typical receiving apparatuses of the wireless communication device 100, such as an antenna.

The storage module 12 is electronically connected to the receiving module 11, and is configured for storing data received from the receiving module 11. The storage module 12 can either be mounted independently within the wireless communication device 100 or combined with typical storage member of the wireless communication device 100, such as NVRAM (Non-Volatile Random Access Memory).

The processing module 13 is electronically connected to the receiving module 11, and is configured to process the aforementioned data. The processing module 13 can switch the network of one base station to network of another base station and sends cell broadcast to the wireless communication device 100 according to received handover commands.

The warning module 14 is a typical warning apparatus, such as ring or vibrating apparatus, and is configured to alert the user via sound or vibration. The warning module 14 is electronically connected to the processing module 13 and controlled by the processing module 13.

Figure 2:
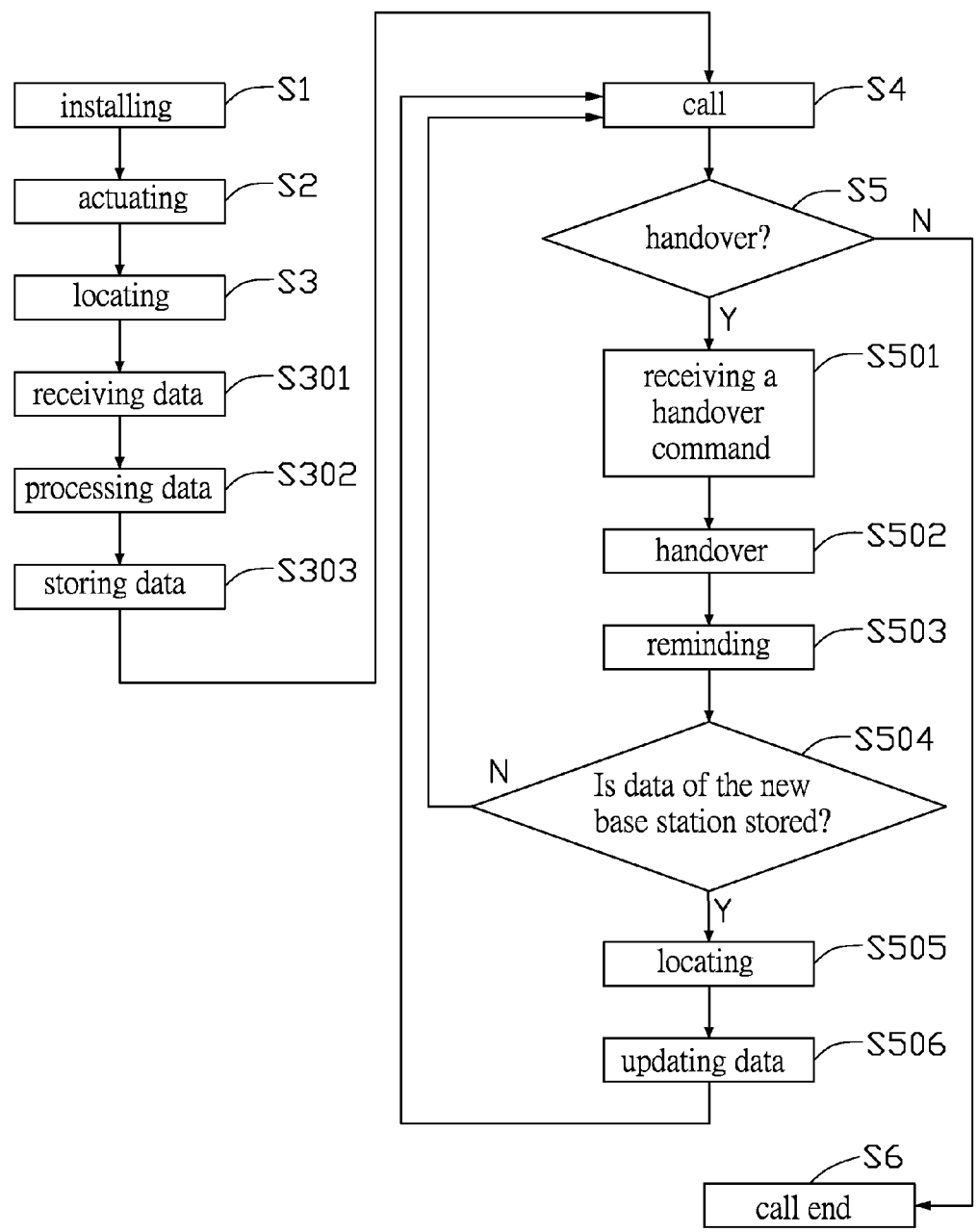
FIG. 2 is a flow chart of a handover warning method, in accordance with a present embodiment.

Also referring to FIG. 2, a method for warning wireless communication device when a handover takes place during a call, in accordance with a present embodiment, is provided. The method includes these steps as follows.

An aforementioned warning system 10 is provided, and the warning system 10 is installed in an aforementioned wireless communication device 100 (Step S1).

The wireless communication device 100 is actuated in a predetermined service area (Step S2). There is at least one base station I of a wireless communication network A set in the service area. The network A communicates with the wireless communication device 100 in typical methods, for example, the base station I sends data, such as cell broadcast and cell identification (ID), to the wireless communication device 100 in a predetermined frequency. The base station I can also and send handover commands to the wireless communication device 100.

The wireless communication device 100 is located via the warning system 10 (Step S3). This step includes these substeps as follows:

(1) The data sent by the base station I is received by the receiving module 11, and other data, such as sending frequency of the base station I, is also recorded by the receiving module 11 (Substep S301);
(2) The processing module 13 processes the received data to identify the service area of the base station I and locate the wireless communication device 100. (Substep S302);
(3) The processed received data and other data, such as location of the wireless communication device 100, is stored in the storage module 12 (Substep S303).

Understandably, to correctly locate the wireless communication device 100 at any moment, the substeps S301, S302 and S303 are repeated in a predetermined frequency, for example, once per second or once per five seconds. The last data received by the receiving module 11 is automatically compared with the data stored in the storage module 12 by the processing module 13. If the wireless communication device 100 enters a new service area, the network A communicating with the wireless communication device 100 is switched to a new wireless communication network B of the new service area, and the base station I of the network A which sends cell broadcast to the wireless communication device 100 is switched to the base station II of the network B. Thus, the data is updated, and the wireless communication device 100 can alert the user via typical methods, such as displaying the cell broadcast sent by the new base station II. The data of the previous base station, such as that of the base station I, is stored in the storage module 12 to be used in the continuing steps.

The wireless communication device 100 is used to call (Step S4).

During a call, when the wireless communication device 100 enters a new service area, the network A communicating with the wireless communication device 100 is switched to the network B, and the warning system 10 alerts the calling user immediately (Step S5). This step includes these substeps as follows:

(1) A handover command sent by a new base station II of the network B is received by the receiving module 11, the handover command requires the network A communicating with the wireless communication device 100 to be switched to the network B, and the base station sending cell broadcast to the wireless communication device 100 is switched from the base station I to the base station II. (Substep S501);

(2) The processing module 13 switches the network A communicating with the wireless communication device 100 to the network B according to the handover command (Substep S502);

(3) The processing module 13 controls the warning module 14 to output a alerting signal, such as a ring/sound or a vibration, to alert the calling user that the wireless communication device 100 has entered another service area (Substep S503); in this way, the handover is perceptible to the user;

(4) The processing module 13 searches the aforementioned data of the base station II in the storage module 12 according to the handover command (Substep S504). If the data of the base station II cannot be found in the storage module 12, the wireless communication device 100 remains in an ongoing communication (i.e., Step S4) without any interruptions until the call ends (Step S6).

(5) If the wireless communication device 100 has ever communicated with the network B, receiving module 11 would have received the data of the base station II and stored the data in the storage module 12 according the method of Step S3. Thus, the processing module 13 identifies the service area of the wireless communication device 100 according to the data, and locates the wireless communication device 100 (Substep S505).

(6) After Substep S505, the data of the base station II is regarded as the most recent data (i.e., the current information for locating the wireless communication device 100) in the storage module 12 for locating, thus the stored data is updated (S506).

After Step S5, if the wireless communication device 100 does not enter another new service area, there is no another base station to send new handover commands to the wireless communication device 100. Thus, the wireless communication device 100 remains in an ongoing communication (i.e., Step S4) without any interruptions until the call ends (Step S6). If the wireless communication device 100 enters another new service area, and a new base station sends a new handover command to the wireless communication device 100, Step S5 is operated again.

Understandably, in the wireless communication device 100 and the warning method, the stored data of the base station of the network communicating with the wireless communication device 100 can be updated at any time. Therefore, when the wireless communication device 100 enters a new service area, the user of the wireless communication device 100 can be alerted immediately, regardless if the wireless communication device 100 is in a call or not.

Additionally, for saving storage space of the storage module 12, the data can be stored for a predetermined time (For example, one day) and a predetermined frequency (For example, per hour) via the processing module 13, thus the storage module 12 is always storing necessary data.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A handover warning method for wireless communication devices in a call, comprising the steps of:
   providing a wireless communication device and a warning system installed in the wireless communication device;
   setting a base station of a network in a service area and sending data of the service area in a predetermined frequency, the data of the service area including cell broadcast, cell identification and a sending frequency of the base station;
   actuating the wireless communication device in the service area;
   locating the wireless communication device;
   using the wireless communication device to call; and
   when the wireless communicating device enters a new service area during the call, outputting an alerting signal with the warning system during the call and continuing the call without interruption until the call ends, including these substeps:
      receiving a handover command sent by a new base station of a new network in the new service area;
      switching the wireless communication device to receive data sent by the new base station according to the handover command;
      alerting the calling user that the wireless communication device has entered the new service area;
      searching data of the new base station, and continuing the call when data of the new base station cannot be found;
      locating the wireless communication device according to the data of the new base station when data has been found; and
      updating the stored data.

2. The handover warning method as claimed in claim 1, wherein the step of locating the wireless communication device includes these sub steps:
   (1) receiving the data sent by the base station;
   (2) processing the relative received data to locate the wireless communication device; and
   (3) storing data.

3. The handover warning method as claimed in claim 1, further comprising a step of outputting an alerting signal again during the call when the wireless communication device enters another new service area in the continuing call.

* * * * *